July 4, 1939.  H. NUTT  2,164,540
AUTOMATIC CLUTCH
Filed May 25, 1933 4 Sheets-Sheet 2
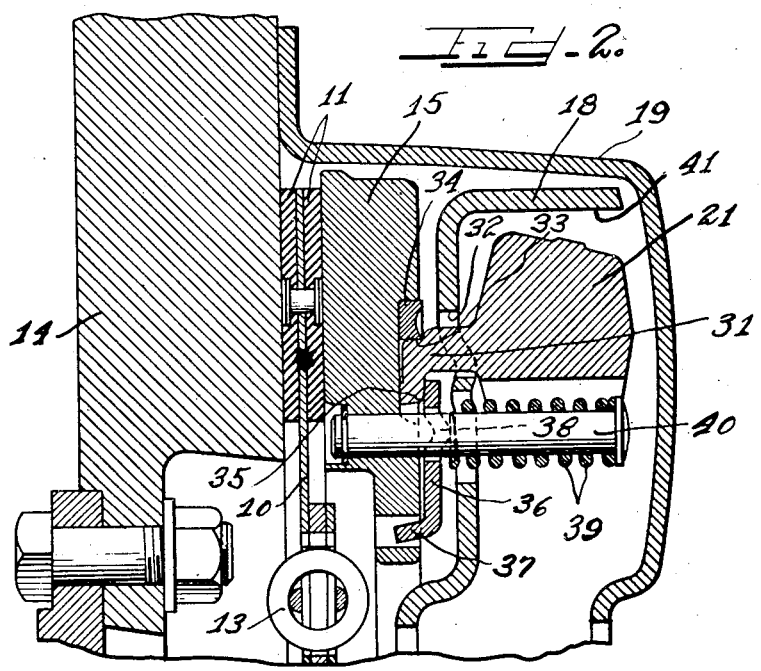
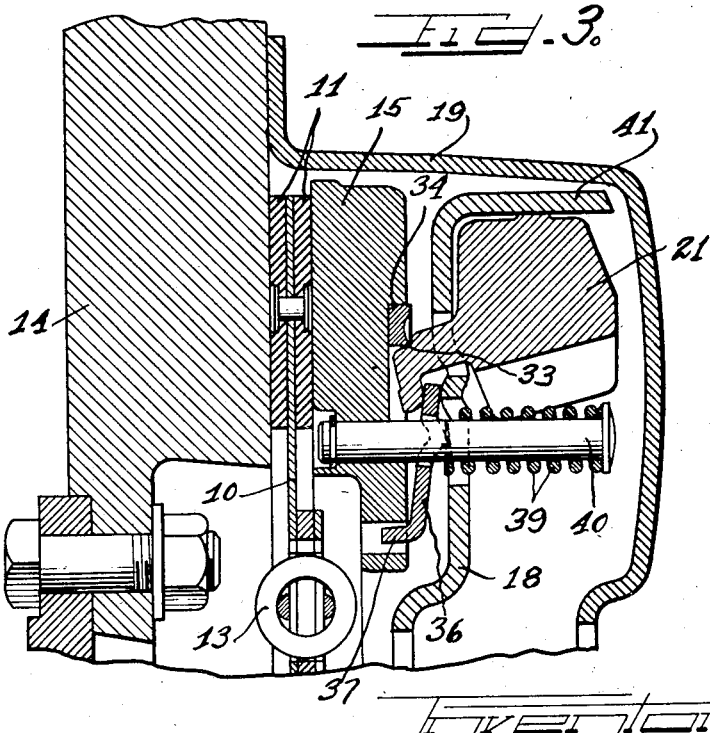
Inventor
Harold Nutt.
by Charles O. Hills Attys.

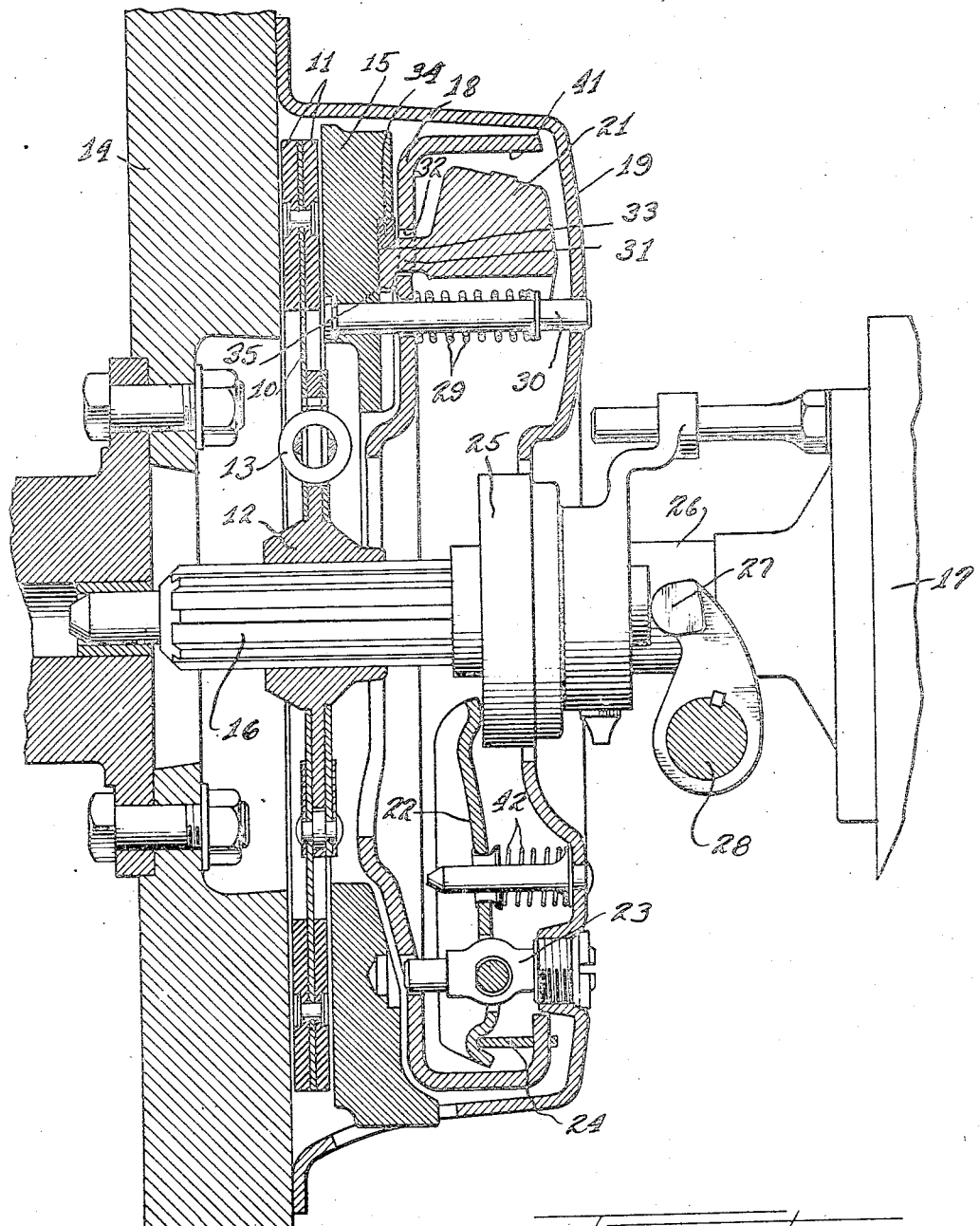

July 4, 1939.   H. NUTT   2,164,540
AUTOMATIC CLUTCH
Filed May 25, 1933   4 Sheets-Sheet 3
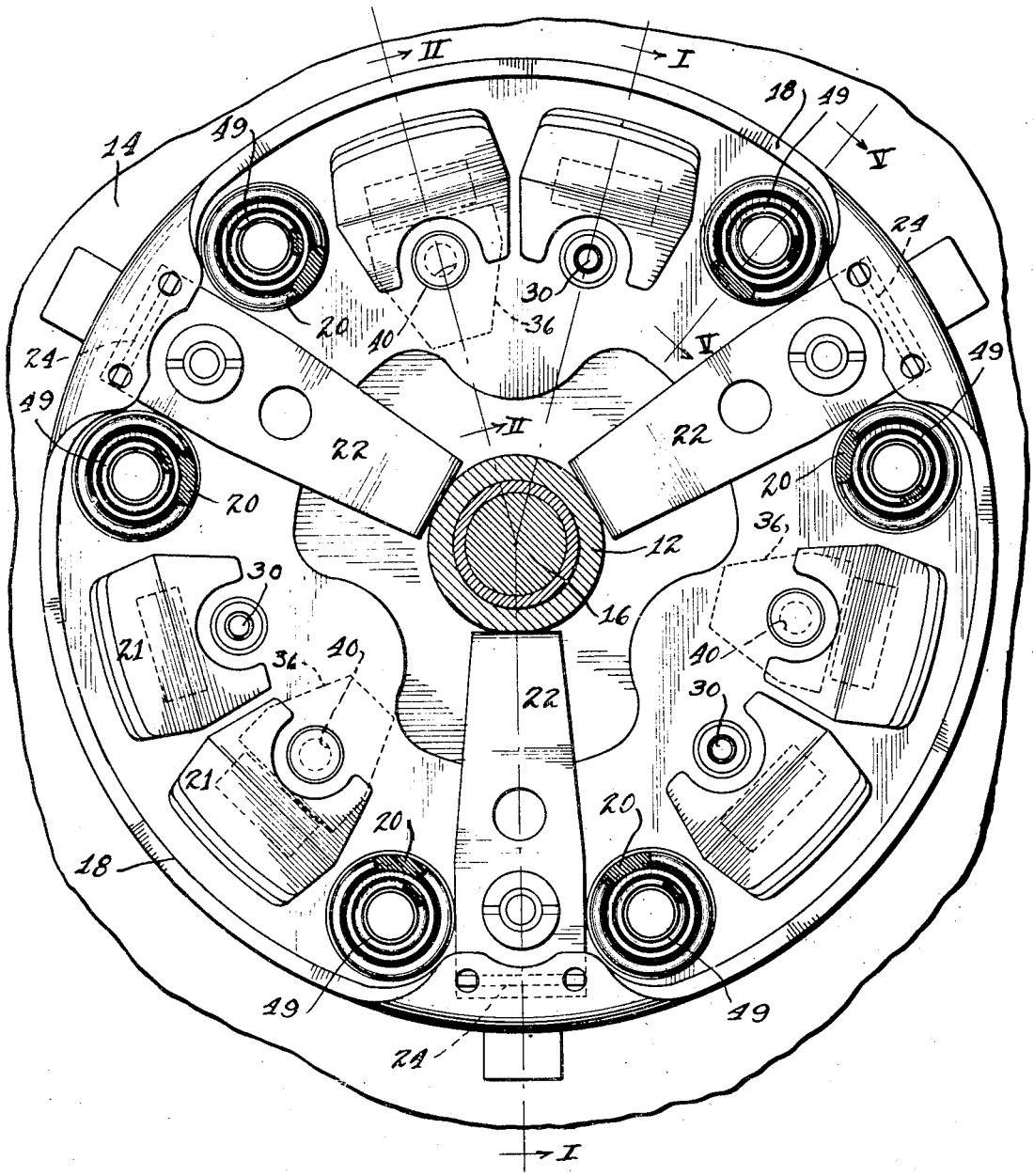
Inventor
Harold Nutt.
by Charles T. Hills Attys.

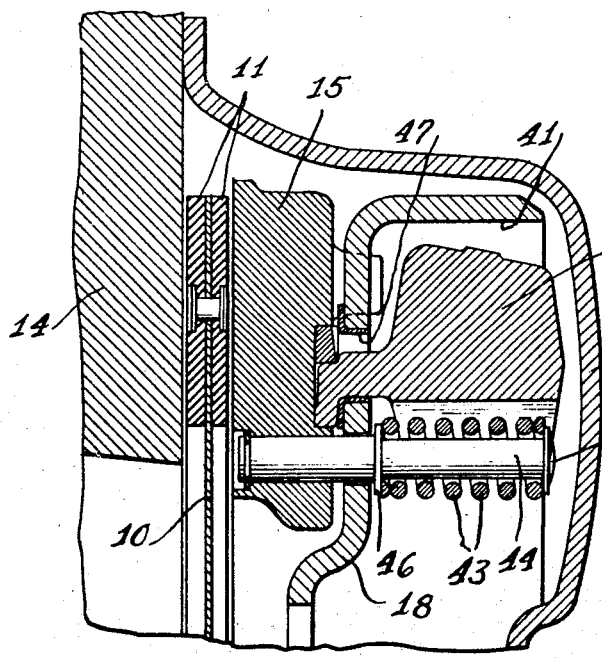
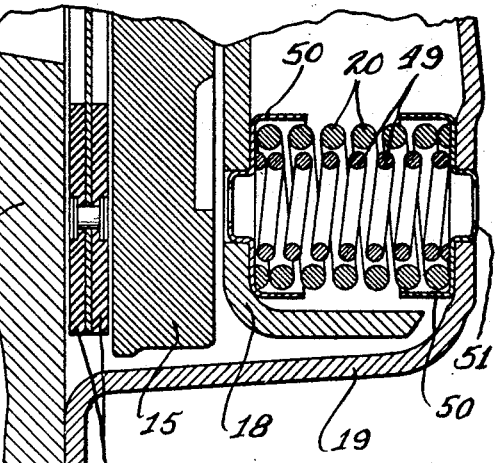
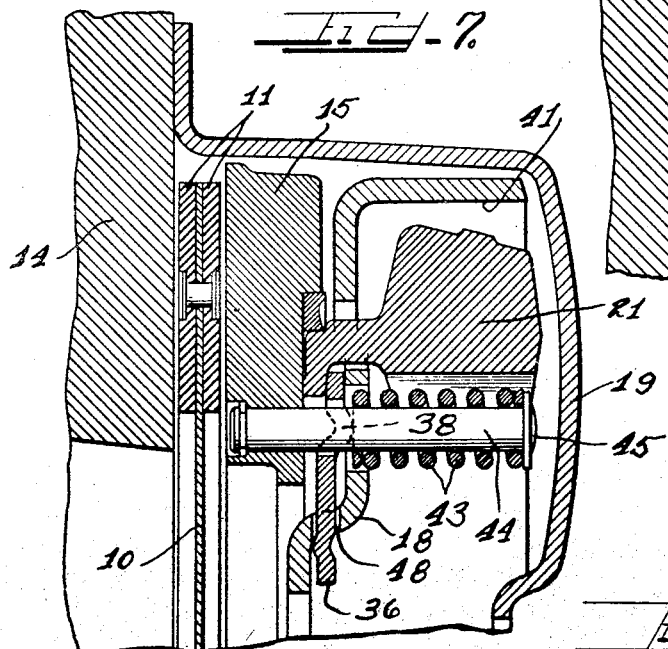

Patented July 4, 1939

2,164,540

UNITED STATES PATENT OFFICE 2,164,540

AUTOMATIC CLUTCH

Harold Nutt, Chicago, Ill., assignor, by mesne assignments, to Borg-Warner Corporation, Chicago, Ill., a corporation of Illinois Application May 25, 1933, Serial No. 672,820

11 Claims. (Cl. 192—105)

This invention relates to an improved automatic clutch of the type capable of automatically engaging upon attaining a predetermined rotative speed, and disengaging below such rotative speed. While the chosen embodiment of this invention has been especially designed for automotive service it will be evident that the clutch of this invention is capable of being used in a wide variety of other applications.

It is an object of this invention to provide an improved automatic clutch of the centrifugally energized type that will have a predetermined and limited slip range during engagement that corresponds to a predetermined variation or increase in rotative speed above that sufficient to cause initial engagement, whereby the clutch will engage with a gradually increasing force in order to smoothly pick up the load with a sufficiently delayed action to prevent grabbing or shocks incident to sudden full engagement.

It is another object of this invention to provide an improved and simplified centrifugally energized clutch having a prolonged engaging action over a predetermined speed range while under complete manual control, both for engagement or disengagement unaffected by the operation of the centrifugal control. With this arrangement the clutch can always be manually operated in a manner exactly similar to that of a normal non-automatic clutch, while when the manual control is in its mid position the clutch engages and disengages automatically in response to centrifugal forces derived from the speed of rotation of the driving member.

It is a further object of this invention to provide an improved and simplified centrifugally energized clutch that becomes partially engaged at a predetermined rotative speed slightly above idling speed, and that becomes fully engaged at a second and higher predetermined rotative speed, clutch slippage progressively decreasing as speed increases between the two critical speeds in order to gradually pick up the load during a time interval sufficient to provide satisfactory operation in the lowest gear ratio of an automotive installation. In such installations quick clutch engagement is desirable when shifting between the gear ratios and such engagement is facilitated by the rapid engine acceleration available under such conditions while a much slower rate of clutch engagement is necessary in picking up the load from a standing start which delay is then obtainable due to the slip range between the different rotative speeds at which initial and full engagement occur.

It is a further object of this invention to provide an improved and simplified automatic clutch operating structure energized by centrifugal force wherein the clutch engaging pressure is limited to a predetermined maximum unaffected by further increases in centrifugal force beyond that required for initial full engagement.

It is still a further object of this invention to provided an improved and simplified automatic clutch that can be economically manufactured, easily serviced and interchanged with normal manually operable clutches without change in the space or mounting requirements.

Other and further important objects of this invention will be apparent from the disclosures in the specification and the accompanying drawings.

This invention, in a preferred form, is illustrated in the drawings and hereinafter more fully described.

On the drawings:

Figure 1 is a central vertical axial section through a clutch embodying the features of this invention and taken on the line I—I of Fig. 4, showing the clutch in its disengaged position. The upper part of this view discloses the first stage centrifugally energized mechanism to provide initial engagement at a rotative speed below that required to energize the second stage mechanism of Figs. 2, 3, 6 and 7.

Fig. 2 is a fragmentary section on the line II—II of Fig. 4 of one form of second stage mechanism, shown with the first stage energized to take up running clearances while the second stage is still inactive.

Fig. 3 is a section similar to Fig. 2 showing the second stage energized to provide full clutch engagement.

Fig. 4 is a rear elevation of the clutch structure with the housing and throwout bearing omitted.

Fig. 5 is a fragmentary detail section on the line V—V of Fig. 4 showing one of the clutch pressure spring assemblies.

Fig. 6 is a fragmentary section of a modified form of second stage centrifugally energized mechanism.

Fig. 7 is a fragmentary section of another modified form of second stage centrifugally energized mechanism.

The illustrated clutch comprises a conventional driven disc 10 carrying friction facings 11 and mounted on a hub 12 through a torque cushioning drive including springs 13. The disc is disposed between the rear face of an engine flywheel 14 and an axially movable pressure plate 15, which plate is advanced towards the flywheel to take up running clearances and clamp the driven disc against the flywheel to transmit power therefrom to a driven shaft 16 which forms the driving shaft of a transmission 17.

The pressure plate 15 is backed by a spring mounting ring 18 within a housing 19 bolted to the flywheel, pressure springs 20 and 49 being preloaded, between the spring ring and the housing, as shown in Fig. 5, to a total pressure determined by the desired torque rating of the clutch. These springs are equivalent to the pressure springs of a normal clutch, and determine the maximum engaging pressure transferred to the pressure plate when a series of centrifugal weights 21 swing outwardly as will hereinafter be described. The spring ring is normally held in the position shown in Fig. 1 by throwout fingers 22 roller fulcrumed to a mounting stud 23 adjustably secured to the housing, the outer ends of the throwout fingers having a link 24 connecting to the spring mounting ring, while the inner ends of the fingers normally contact and follow a throwout bearing 25 slidable on a sleeve 26 enveloping the driven shaft. The throwout bearing is backed by a throwout fork 27 on a shaft 28, and when the bearing is held in the position of Fig. 1, it acts through the multiplying leverage of the throwout fingers 22 to hold the spring mounting ring retracted in the position shown, against the resistance of the load of the pressure springs. The pressure plate, when the centrifugal weights are in their unenergized position shown in Fig. 1, is caused to follow the spring mounting ring by retractor springs 29 on shouldered guide studs 30 carried by the pressure plate, thus holding the clutch in its released position. Upon backing off the throwout bearing, i. e., moving it to the right as by retracting the usual clutch pedal (not shown), the clutch can be engaged while the centrifugal weights are inactive, thus permitting clutch engagement with a dead engine, as when it is desired to start the engine by pushing the car. By moving the throwout bearing 25 to the left from the central position shown in Fig. 1, the automatically engaged clutch can be manually disengaged in the same way as a normal non-automatic clutch.

The automatic or centrifugal engagement of the clutch for the first stage of engagement is accomplished by the outward swing of half of the weights 21, which carry offset lugs 31 interposed between the pressure plate and the spring mounting ring, passing through slots 32 in the latter. The lugs 31 resemble boots, the heels 33 thereof form fulcrums for the weights, bearing against hardened inserts 34 on the pressure plate; while the toes 35 thereof engage beneath the spring mounting ring. An outward movement of the weights 21 due to centrifugal force acts between the heels 33 and toes 35 to pry the pressure plate and spring mounting ring apart, the pressure plate moving to the left until running clearances are taken up.

The second stage weights 21 of Figs. 2, 3, 6 and 7 then come into action at a higher rotative speed. Both sets of weights are exactly alike and the relative number in each set is one of the variable factors affecting the rate of engagement. The second stage weights are fulcrumed in the same way as the first stage weights, the difference in action being determined by the means for transmitting the pressure of the toes 35 to the spring ring to place additional pressure on the pressure plate. The preferred form of second stage mechanism shown in Figs. 2 and 3 provides a lever 36 interposed between the toe 35 and the spring ring, the lever being fulcrumed to the pressure plate at 37 and having a hump 38 engaged by a retractor spring 39. During the initial stage of clutching movement, determined by the first stage weights, the second stage weights will move from the position shown in Fig. 2 toward the position shown in Fig. 3 against the retractive force of the springs 39. In doing so, they exert no pressure between the mounting ring 18 and the pressure plate 15, for the reason that the levers 36 are not in engagement with the mounting ring 18 until the completion of this stage of movement. The only effect, then, of this stage of movement of the second stage weights is to move the levers 36 against the action of the springs 39 so as to take up the clearance between the levers 36 and the ring 18. Thereafter, in the second stage of movement, the weights will exert pressure against the ring 18 through the medium of the levers 36, thereby supplementing the prying effect of the initial stage weights. The relative positions of the lever fulcrum, hump and toe purchase gives a mechanical advantage to the latter relative to the humps 38, which are radially aligned with a stud 40 guiding the second stage retractor spring 39 acting to hold the weight in its inactive position due to the anchorage of the stud in the pressure plate. It will be noted from a comparison of Figs. 1 and 2 that the second stage retractor springs 40 are heavier than the first stage retractor springs 29 and each set of springs determines the centrifugal force necessary to swing out the centrifugal weights acting thereagainst. Thus it is possible by a suitable choice of spring strength for each stage, to have any desired differential between the rotative speeds at which each stage is energized.

When both sets of weights 21 swing out into contact with a limiting peripheral flange 41 on the spring mounting ring the ring is moved slightly towards the right, transferring the pressure spring load to the pressure plate and at the same time withdrawing the throwout fingers from contact with the throwout bearing when the latter is in the middle position shown in Fig. 1. Light springs 42 then serve to take up looseness in the finger linkage. This is the normal driving position wherein the clutch automatically engages and disengages in response to variations in engine speeds above and below a predetermined critical speed slightly above idling.

The second stage modification of Fig. 6 makes no distinction between the action of the first and second stage weights 21 which therefore act in unison. The second stage effect is obtained by special springs 43 on studs 44 anchored in the pressure plate. The springs 43 are compressed between a head 45 and a loose washer 46 normally seating on a shoulder on the stud out of contact with the spring mounting ring. With this arrangement the outward swing of the weights 21 will shift the pressure plate away from the spring mounting ring until the washer 46 contacts the spring mounting ring, this movement forming the first stage. The second stage movement is delayed until greater centrifugal force is developed by a higher rotative speed since further movement of the pressure plate is resisted by the added pressure of the springs 43 as the washer is shifted away from its seat on the stud shoulder. As in the other forms of the invention, full pressure engagement of the clutch involves a slight shift of the spring mounting ring to the right to transfer the full load of the pressure springs 20 to the pressure plate, this movement of the spring mounting ring also shifting the throwout fingers away from the throwout bearing to prevent unnecessary wear thereof as well as to assure full clutch engagement.

Fig. 6 also illustrates a refinement in mounting the weights in the slots 32 in the spring mounting ring, a hardened and flanged bushing 47 being inserted in the slot to take the wear incident to the operation of the weights.

The second stage modification of Fig. 7 differs from the principal form in that the lever 36 is fulcrumed in a slot 48 in the spring mounting ring, instead of to the pressure plate as in Fig. 2. With this arrangement the lever and retractor spring 43 can be so proportioned as to eliminate the need for the light first stage retractor springs 29 shown in Fig. 1 because the proportion of the load of the springs 43 which is transmitted by the lever 36 to the spring mounting ring can be made equivalent to the pressure exerted on the spring mounting ring by the light springs 29.

The detail of the mounting of the pressure springs 20 shown in Fig. 5 includes an inner helper spring 49, both springs being mounted in spring guiding cups 50 located in apertures in the housing and spring mounting ring by central bosses 51. This method of mounting the pressure springs is not essential but is an advantageous way of overcoming the distortion effects of centrifugal force on the pressure springs.

The operation of the component parts of the clutch has been described hereinbefore in connection with the description of the various component parts but it will be convenient to summarize and correlate the operation of the various elements at this point. With the clutch parts in the position shown in Fig. 1, which represents the clutch in its automatically disengaged position corresponding to a dead or idling engine, the clutch may be manually engaged in the usual manner by retracting the throwout bearing to the right from its mid-position shown in the figure. Such a movement of the throwout bearing allows the pressure springs 20 to shift the spring mounting ring and pressure plate to the left, because the throwout fingers are then free to pivot clockwise following the throwout bearing, thus causing full manual engagement of the clutch under a spring pressure equivalent to that of a normal manually controlled clutch.

The clutch may also be automatically engaged from the position shown in Fig. 1 by speeding up the engine above its idling or no-load speed, the first effect of such an increase in engine speed being to partially swing out the first stage weights to shift the pressure plate to the left, away from the spring mounting ring, to take up the running clearances between the flywheel, driven disc and pressure plate. This causes a relatively light clutch engagement, with considerable slippage if a heavy resistance is encountered in the final drive, and thus facilitates a gradual picking up of the load. At the engine speed to which the first stage weights respond, the second stage weights are held inactive by additional spring loads imposed by the second stage retractor springs 39 acting on the levers 36. This is not true of the second stage of Fig. 6 however as in that structure all the weights operate at the first stage and the movement of the pressure plate is temporarily halted at an equivalent point by the additional load imposed by the second stage springs 43.

As the engine speed is increased above that required for energization of the first stage weights a higher speed is reached at which the increased centrifugal force developed is sufficient to swing the second stage weights outwardly against the resistance of the additional spring load opposed thereto. The second stage weights swing out to the intermediate position of the first stage weights and finally all the weights swing out into contact with the peripheral flange of the spring mounting ring which flange absorbs any further centrifugal force developed in the weights by higher engine speeds. The final movement of both sets of weights serves both to further compress the driven disc and to slightly shift the spring mounting ring to the right to fully transfer the pressure spring load to the pressure plate, at the same time retracting the throwout fingers from the throwout bearing.

When the clutch is thus automatically engaged, a manual movement of the throwout bearing to the left from its mid-position, as by depressing the usual clutch pedal, the throwout fingers will be rotated counterclockwise to retract both the spring mounting ring and the pressure plate to release the clutch. Under these circumstances, the spaced relationship between the spring mounting ring and the pressure plate will not be affected so that the operation of manually disengaging the automatically engaged clutch, even at high engine speeds, does not have to overcome the centrifugal force acting on the weights, but merely to compress the pressure springs, as in a normal manually controlled clutch.

It will thus be seen that I have invented an improved and simplified automatic clutch which is entirely subordinated, under all conditions, to a manual control operatable at will by the operator, and in which the automatic engagement is accomplished over a predetermined slip range sufficient to smoothly pick up a heavy load on low gear from a standing start, while the increased acceleration available would provide a more rapid engagement to prevent undue slippage when shifting into a higher gear when the load resistance is less due to the momentum of a moving vehicle.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. An automatic clutch comprising a driving member, a driven member, a pressure plate revolving with the driving member and movable to engage the driven member, a spring mounting ring associated with the pressure plate, preloaded pressure springs urging the spring mounting ring towards clutch engagement, clutch throwout mechanism operable at will to move said spring mounting ring against the pressure of the preloaded pressure springs, a plurality of centrifugally energizable weights pivoted between the pressure plate and the spring mounting ring and adapted to pry said plate and ring apart when energized whereby to advance the pressure plate into engagement with the driven member, means cooperating with certain of the weights and the spring ring, and pressure means acting between said last mentioned means and the pressure plate to retard the action of the cooperating weights to require a higher rotative speed for the energization thereof relative to that required for the remaining weights.

2. An automatic clutch comprising a driving member, a driven member, a pressure plate revolving with the driving member and movable to engage the driven member, a spring mounting ring associated with the pressure plate, preloaded pressure springs urging the spring mounting ring towards clutch engagement, clutch throwout mechanism operable at will to move said spring mounting ring against the pressure of the preloaded pressure springs, a plurality of centrifugally energizable weights pivoted between the pressure plate and the spring mounting ring and adapted to pry said plate and ring apart when energized whereby to advance the pressure plate into engagement with the driven member, means cooperating with certain of the weights and the spring ring, pressure means acting between said last mentioned means and the pressure plate to retard the action of the cooperating weights to require a higher rotative speed for the energization thereof relative to that required for the remaining weights, said throwout mechanism being shiftable to engage or disengage the clutch contrary to the automatic control thereof.

3. An automatic clutch comprising a driving member, a driven member, a pressure plate revolving with the driving member and movable to engage the driven member, a spring mounting ring associated with the pressure plate, preloaded pressure springs urging the spring mounting ring towards the pressure plate, clutch throwout mechanism operable at will to move said spring mounting ring against the pressure of the preloaded pressure springs, a plurality of centrifugally energizable weights pivoted between the pressure plate and the spring mounting ring and adapted to pry said plate and ring apart when energized whereby to advance the pressure plate into engagement with the driven member, means cooperating with certain of the weights and the spring ring, pressure means acting between said last mentioned means and the pressure plate to retard the action of the cooperating weights to require a higher rotative speed for the energization thereof relative to that required for the remaining weights, said throwout mechanism being shiftable to advance the spring mounting ring and pressure plate into driving engagement with the driven member independently of the action of the centrifugally energized means.

4. An automatic clutch comprising a driving member, a driven member, a pressure plate revolving with the driving member and movable to engage the driven member, a spring mounting ring associated with the pressure plate, pressure springs preloaded against the spring mounting ring, clutch throwout mechanism operable at will to move said spring mounting ring against the pressure of the preloaded pressure springs, a plurality of centrifugally energizable weights pivoted between the pressure plate and the spring mounting ring and adapted to pry said plate and ring apart when energized whereby to advance the pressure plate into engagement with the driven member, means cooperating with certain of the weights and the pressure plate, and pressure means acting between said last mentioned means and the pressure plate to retard the action of the cooperating weights to require a higher rotative speed for the energization thereof relative to that required for the remaining weights.

5. An automatic clutch comprising a driving member, a driven member, a pressure plate revolving with the driving member and movable to engage the driven member, a spring mounting ring associated with the pressure plate, pressure springs preloaded against the spring mounting ring, clutch throwout mechanism operable at will to move said spring mounting ring against the pressure of the preloaded pressure springs, a plurality of centrifugally energizable weights pivoted between the pressure plate and the spring mounting ring and adapted to pry said plate and ring apart when energized whereby to advance the pressure plate into engagement with the driven member, means cooperating with certain of the weights and the pressure plate, pressure means acting between said last mentioned means and the pressure plate to retard the action of the cooperating weights to require a higher rotative speed for the energization thereof relative to that required for the remaining weights, said throwout mechanism being shiftable to engage or disengage the clutch contrary to the automatic control thereof.

6. An automatic clutch comprising a driving member, a driven member, a pressure plate revolving with the driving member and movable to engage the driven member, a spring mounting ring associated with the pressure plate, pressure springs preloaded against the spring mounting ring, clutch throwout mechanism operable at will to move said spring mounting ring against the pressure of the preloaded pressure springs, a plurality of centrifugally energizable weights pivoted between the pressure plate and the spring mounting ring and adapted to pry said plate and ring apart when energized whereby to advance the pressure plate into engagement with the driven member, means cooperating with certain of the weights and the pressure plate, pressure means acting between said last mentioned means and the pressure plate to retard the action of the cooperating weights to require a higher rotative speed for the energization thereof relative to that required for the remaining weights, said throwout mechanism being shiftable to advance the spring mounting ring and pressure plate into driving engagement with the driven member independently of the action of the centrifugally energized means.

7. In an automatic clutch, a driving member, a driven member, a pressure plate revolving with the driving member and movable to engage the driven member, a spring mounting ring associated with the pressure plate, pressure springs adapted to urge the mounting ring in clutch-engaging direction, a plurality of centrifugally energizable weights fulcrumed against the pressure plate and having portions adapted to exert pressure between said pressure plate and mounting ring, means interposed between said portions and the mounting ring, out of engagement with the latter when the weights are retracted, said means being arranged to engage the mounting ring at an intermediate position of centrifugal extension of the weights, and to thereafter transmit prying pressure to said mounting ring, and retractor springs acting between said means and the pressure plate in opposition to such pressure.

8. In an automatic clutch, a driving member, a driven member, a pressure plate revolving with the driving member and movable to engage the driven member, a spring mounting ring associated with the pressure plate, pressure springs adapted to urge the mounting ring in clutch-engaging direction, a plurality of centrifugally energizable weights, some of said weights having portions in continuous engagement between the pressure plate and the mounting ring and adapted to pry said plate and ring apart when energized, retractor springs acting between the plate and ring and opposing such prying action, others of said weights being arranged to exert prying action between said plate and ring only after completing an initial stage of centrifugal extension, and supplementary retractor springs acting between said pressure plate and said other weights, adapted to oppose centrifugal extension thereof, both in said initial stage and in the subsequent stage thereof.

9. In an automatic clutch, a driving member, a driven member, pressure-transmitting means including a pressure plate revolving with the driving member and movable to engage the driven member and a spring mounting ring associated with the pressure plate, pressure springs adapted to urge said pressure-transmitting means in clutch-engaging direction, a plurality of centrifugally energizable weights fulcrumed with respect to said pressure-transmitting means and having portions adapted to exert prying pressure between said plate and ring, levers fulcrumed with respect to said pressure-transmitting means and projecting between said portions and the mounting ring, and retractor springs acting between said levers and the pressure plate, maintaining the levers in engagement with said portions and thereby resisting the centrifugally induced movement of said weights, said levers being adapted, at the end of an initial stage of movement of said weights, to engage the mounting ring so as to thereafter transmit prying pressure of said portions between said ring and plate.

10. An automatic clutch as defined in claim 9, wherein said levers are fulcrumed against the pressure plate.

11. An automatic clutch as defined in claim 9, wherein said levers are fulcrumed against the mounting ring.

HAROLD NUTT.